United States Patent [19]

Uomoto

[11] Patent Number: 5,367,543
[45] Date of Patent: Nov. 22, 1994

[54] CIRCUIT FOR DETECTING SYNCHRONIZING SIGNAL IN FRAME SYNCHRONIZATION DATA TRANSMISSION

[75] Inventor: Yasutomo Uomoto, Tokyo, Japan

[73] Assignee: NEC Corporation, Japan

[21] Appl. No.: 938,411

[22] Filed: Aug. 31, 1992

[30] Foreign Application Priority Data

Aug. 30, 1991 [JP] Japan .................. 3-220495
Jun. 3, 1992 [JP] Japan .................. 4-142552

[51] Int. Cl.$^5$ .................. H04L 7/06; H04L 7/00; H04J 3/06
[52] U.S. Cl. .................. 375/116; 375/113; 370/105.1; 370/105.5
[58] Field of Search .............. 370/100.1, 105.1, 105.3, 370/105.4, 108; 375/113, 114, 116

[56] References Cited

U.S. PATENT DOCUMENTS

| 3,472,961 | 10/1969 | Wheeler et al. | 178/69.5 |
| 4,247,936 | 1/1981 | Hustig | 370/105.1 |
| 4,596,981 | 6/1986 | Ueno et al. | 370/105.4 |
| 4,796,282 | 1/1989 | Yoshida | 375/116 |
| 4,811,366 | 3/1989 | Kage | 375/116 |
| 5,228,037 | 7/1993 | Yonehara | 375/114 |

FOREIGN PATENT DOCUMENTS

3722567 7/1987 Germany .
964901 7/1964 United Kingdom .

Primary Examiner—Stephen Chin
Assistant Examiner—Amanda T. Le
Attorney, Agent, or Firm—Ostrolenk, Faber, Gerb & Soffen

[57] ABSTRACT

A circuit for detecting a frame synchronizing signal and a circuit for detecting subframe synchronizing signals in the frame synchronization data transmission are presented. The former circuit generates a first signal which is at the logic 1 exclusively during the period that the frame synchronizing signal is received, and produces the logical product of the first signal and the data signal, the logical product corresponding to any error present in the frame synchronizing signal. In the latter circuit, a window pulse signal which corresponds to the bits of the subframes assigned to the subframe synchronizing signal is first produced, the bits of the data signal which are synchronous to the window pulse signal are next extracted, and an error bit is selected by excluding corrects bits from the extracted bits of the data signal. In this way an error bit in the synchronizing signal in the frame synchronization data transmission is detected.

11 Claims, 10 Drawing Sheets

CIRCUIT FOR DETECTING SYNCHRONIZING SIGNAL IN FRAME SYNCHRONIZATION DATA TRANSMISSION

BACKGROUND OF THE INVENTION

1. Field of the Invention

The present invention relates to frame synchronization data transmission, and in particular to a circuit for detecting an error in a synchronizing signal.

2. Description of the Related Art

In frame synchronization data transmission, the frame is made up of a plurality of subframes, and a frame synchronizing signal, which represents a start of the frame of the data signal, is assigned to the starting or first subframe with a code of a specified pattern. In order to punctuate, if required, the remaining part of the frame, a subframe synchronizing signal of a predetermined logic level is assigned to a specified bit, say the kth bit, of each subframe. The kth bit is normally the first bit.

Figure 1:
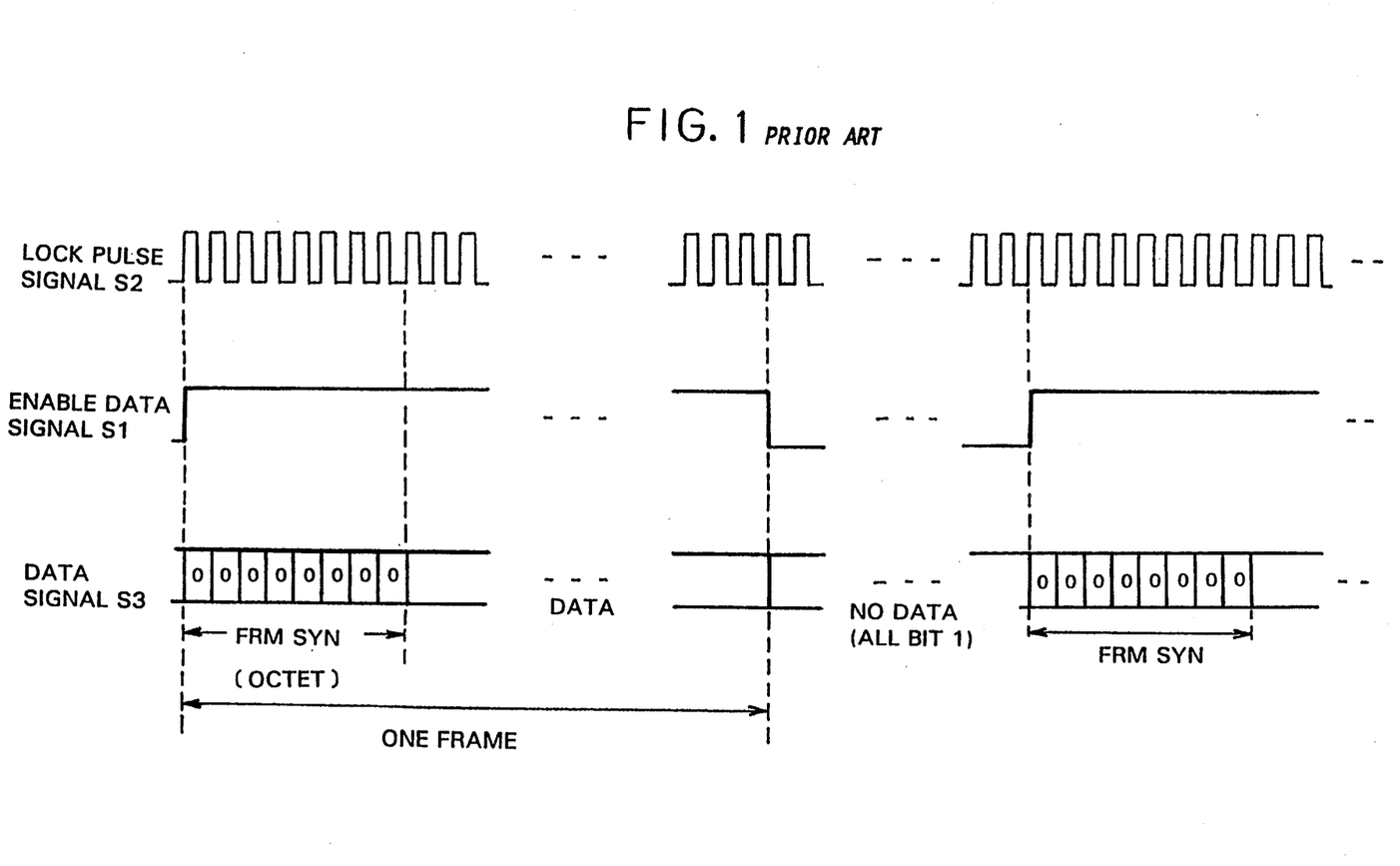
FIG. 1 shows a conventional frame format of a data signal, an enable signal and a clock pulse signal in frame synchronization data transmission.

FIG. 1 shows a conventional frame format of data signal S3, enable signal S1 and clock pulse signal S2 in the frame synchronization data transmission. In the figure, one frame is made up of a plurality of subframes, each subframe having 8 bits, each bit being transmitted in synchronization with clock pulse signal S2. Hereafter, each subframe with 8 bits is referred to as an octet or an OCT. Enable signal S1 makes logic 1 only when a datum is present. A code made up of octadic 0s is assigned to the starting octet as the frame synchronizing signal. The subframe or octet synchronizing signal is not designated in the frame format shown in FIG. 1.

Figure 2:
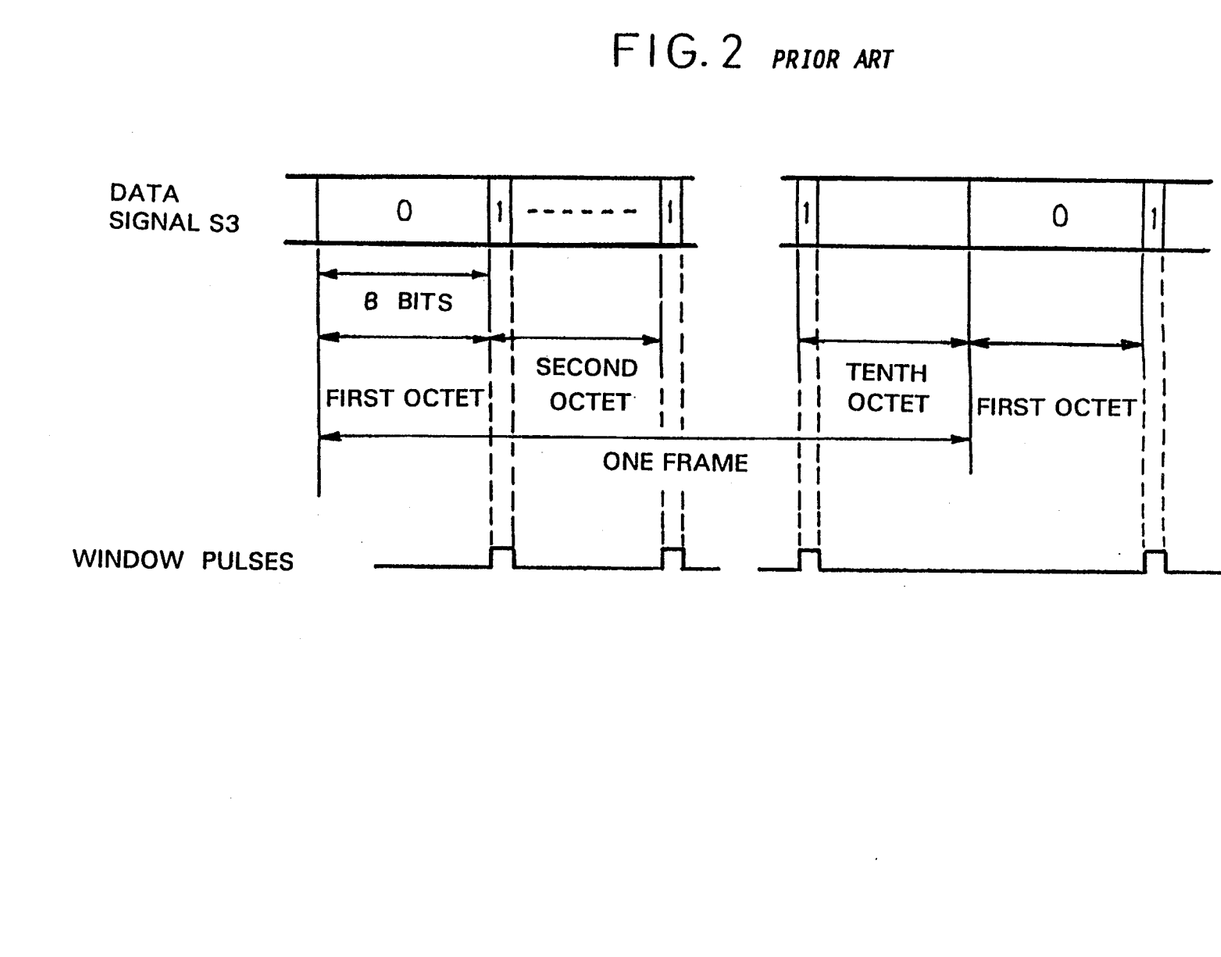
FIG. 2 shows another frame format, where subframe synchronizing signals are assigned.

FIG. 2 shows another frame format, where an octet synchronizing signal is designated. The synchronizing signal is assigned to the first bit of each octet and designated with the logic 1. Hereafter, the frame synchronizing signal and the subframe synchronizing signal are referred to as the FRM SYN and the SBFRM SYN, respectively, and the two SYNs are referred to in general as the SYN.

Figure 3:
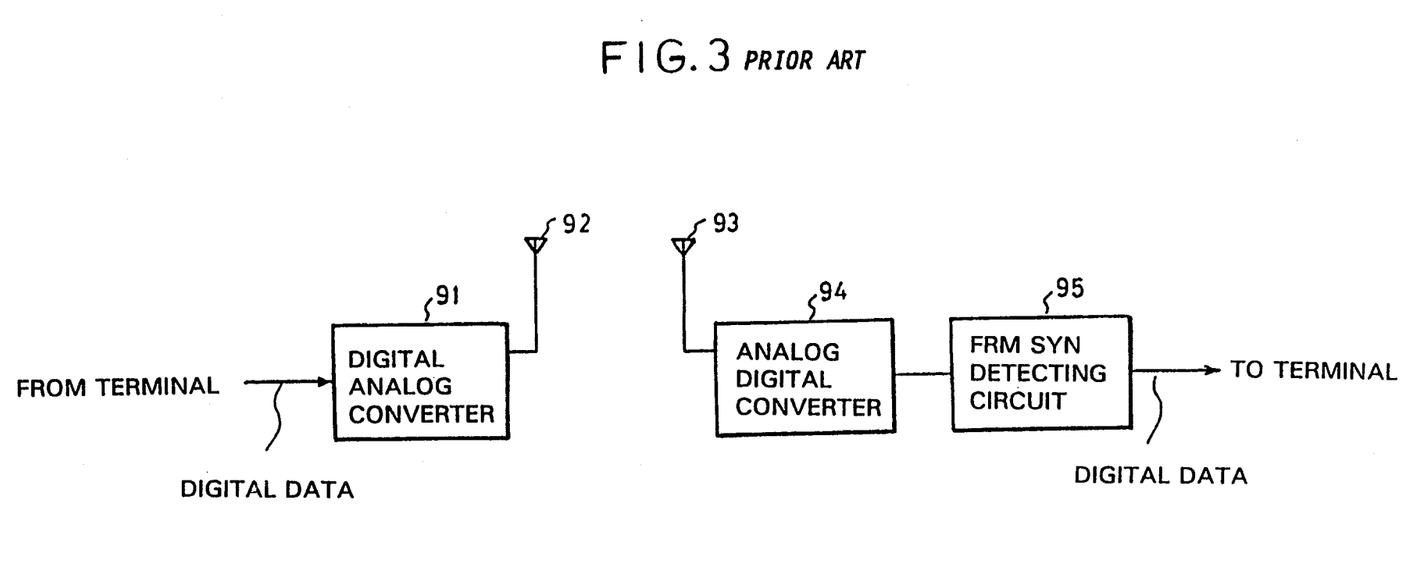
FIG. 3 shows a data transmission system in which a circuit for detecting the frame synchronizing signal is used.

FIG. 3 shows a data transmission system, in which a circuit for detecting an FRM SYN is used. Hereafter the circuit for detecting an FRM SYN is referred to as the FRM SYN detecting circuit. In the transmitting end, a digital data signal sent from a transmitting terminal is converted to an analog data signal by means of digital-analog converter 91. The analog data signal is then transmitted through transmitting antenna 92, received by receiving antenna 93 and supplied to analog-digital converter 94 to be converted to a digital data signal. FRM SYN detecting circuit 95 detects an FRM SYN from the digital data signal in order to distinguish whether the digital data signal is a frame of the transmitted data signal, or a data signal which involves any other information, and then sends the digital data signal to a receiving terminal.

In actual cases the FRM SYN detecting circuit is provided in the transmitting end as well in order to check any possible change in the data signal caused by noise.

Figure 4:
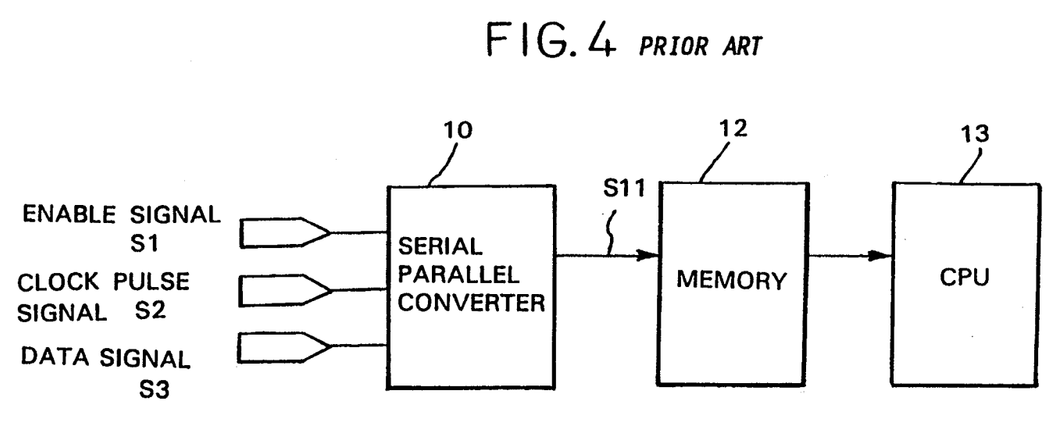
FIG. 4 shows a block diagram of a typical prior art circuit for detecting the frame synchronizing signal.

FIG. 4 shows a block diagram of a typical prior art SYN detecting circuit. The circuit is composed of serial-parallel converter 10, memory 12 and CPU 13. Serial-parallel converter 10, enabled by enable signal S1, receives serial data signal S3, and converts serial data signal S3 to parallel data signal S11 in synchronization with clock pulse signal S2. Parallel data signal S11 is first stored in memory 12. After all the data signals transmitted by the data transmission concerned are stored, CPU 13 detects the SYN by means of software.

A problem encountered in the SYN detecting circuit described above is that, since all the serial-to-parallel-converted data have to be once stored in the memory in order to check the bits assigned to the SYN, it takes a long time to detect them.

SUMMARY OF THE INVENTION

It is an object of the present invention to provide an FRM SYN detecting circuit capable of effecting detection in real time.

It is another object of the present invention to provide an SBFRM SYN detecting circuit capable of effecting detection in real time.

The FRM SYN detecting circuit according to the present invention is directed to detecting any error in the frame format in which all bits of the synchronizing signal are designated with codes of an identical logic level.

The FRM SYN detecting circuit comprises first means for providing a first signal which takes logic 1 exclusively during the period that the frame synchronizing signal is received, and second means for extracting any error bit present in said frame synchronizing signal, said second means being provided with first gate means which receives both said first signal and the data signal transmitted through said frame synchronization data transmission and produces a second signal corresponding to the logic product of the two signals. The second signal is the error bit.

The SBFRM SYN detecting circuit according to the present invention is directed to detecting any error in the frame format in which the frame is made up 10 of a plurality of subframes, each subframe having M bits, each bit transmitted in synchronization with the clock pulse signal for the data transmission, a frame synchronizing signal is assigned to all bits of the starting subframe and a subframe synchronizing signal is assigned to the kth bit of each subframe except for the starting subframe, the kth bit being designated with a first logic level.

The SBFRM SYN detecting circuit comprises starting subframe detecting means both for detecting said starting subframe and for delaying supplied data signal by M clock-pulse periods, said starting subframe detecting means generating a single-pulse signal of the first logic level in synchronization with said kth bit of the second subframe that follows said starting subframe when said starting subframe detecting means does not detect any error in said frame synchronizing signal assigned to said starting subframe, window pulse generating means for generating window pulses, the window pulses being a pulse train with a component pulse generated synchronously with said subframe synchronizing signal of each subframe except for said second subframe, the leading pulse of said pulse train being generated by delaying said single-pulse signal by M clock-pulse periods, the subsequent pulses thereof recursively generated by delaying the preceding pulse by M clock-pulse periods, and a pulse of the recursively generated pulses that is synchronous with said single-pulse signal being excluded from being output, transmission gate means which selects said kth bit of said subframe except for said starting subframe from said data signal delayed by said starting subframe detecting means under control of said window pulses, and error detecting gate means which selects from the output of said transmission gate means any error bit of said subframe synchronizing signals.

The above and other objects, features, and advantages of the present invention will become apparent from the following description referring to the accompanying drawings which illustrate examples of preferred embodiments of the present invention.

DETAILED DESCRIPTION OF THE PREFERRED EMBODIMENTS

Figure 5:
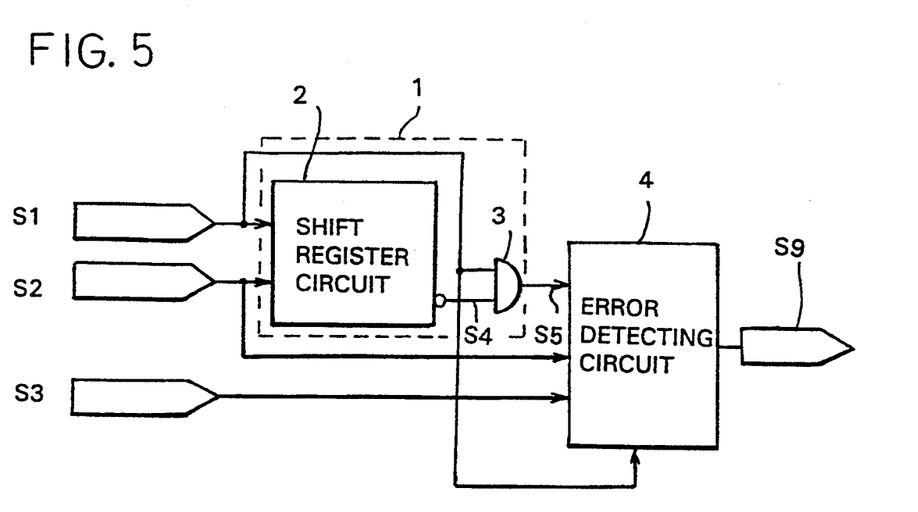
FIG. 5 shows a block diagram of a first embodiment of the present invention.
Figure 6:
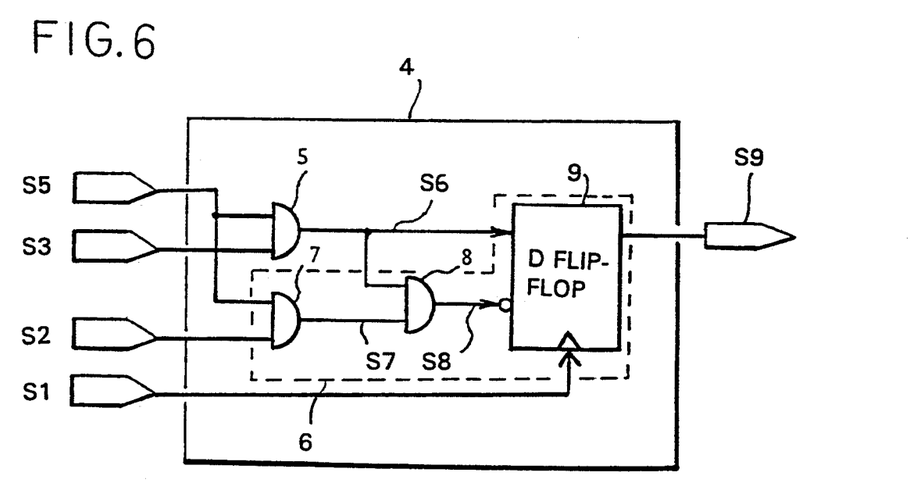
FIG. 6 represents a block diagram of error detecting circuit 4 shown in FIG. 5.
Figure 7:
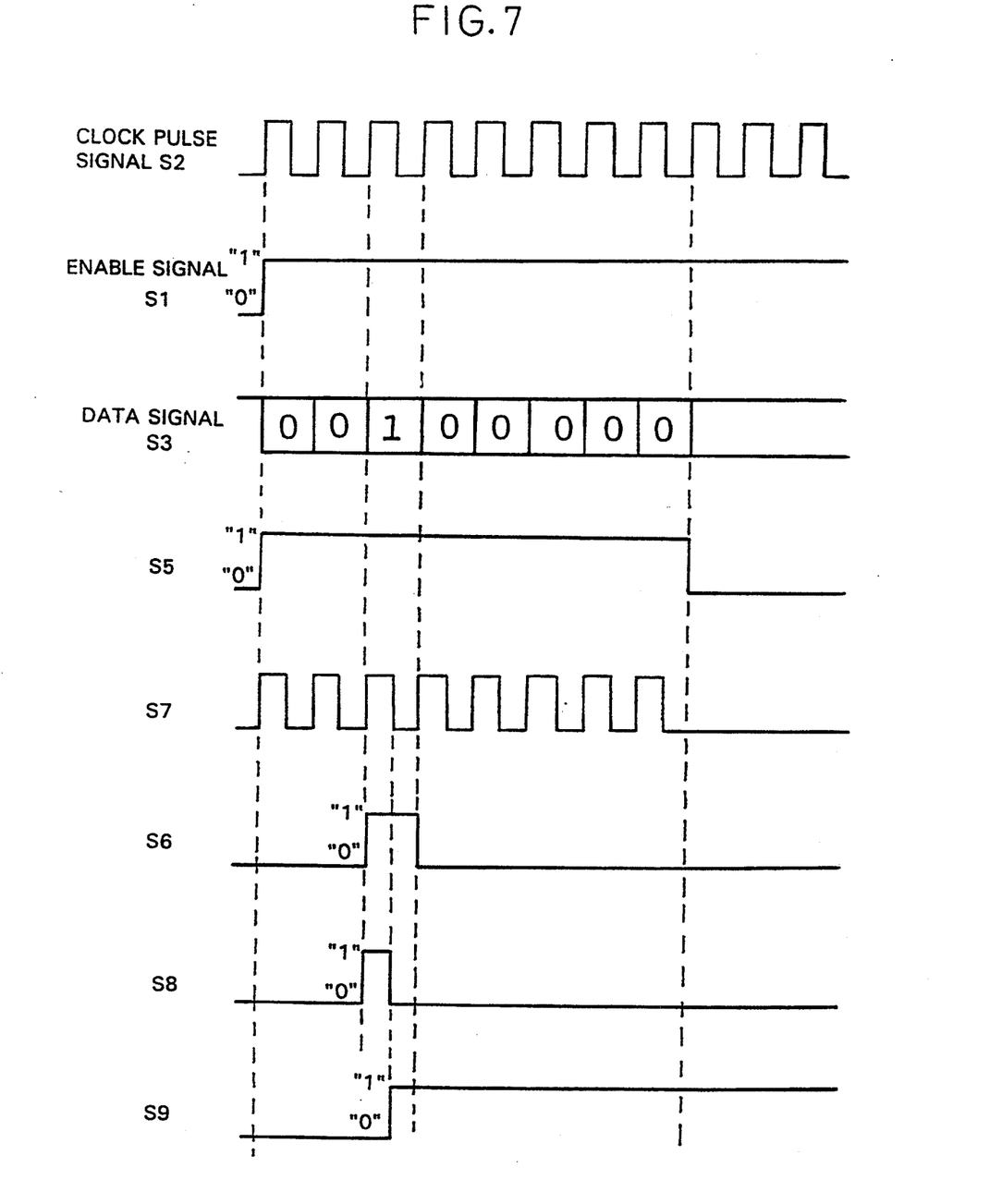
FIG. 7 represents a timing chart to illustrate the operations of parts of the circuits shown in FIGS. 5 and 6.

FIG. 5 shows a block diagram of a first embodiment of the present invention, and FIG. 6 represents a block diagram of error detecting circuit 4 shown in FIG. 5. These figures illustrate circuits for detecting a frame synchronizing signal or an FRM SYN detecting circuit. FIG. 7 represents a timing chart to illustrate the operations of parts of the circuits shown in FIGS. 5 and 6. In this embodiment, the format of the frame is identical with that illustrated in FIG. 1, the FRM SYN being assigned to the starting octet with each bit designated with logic 0. In FIG. 7, an FRM SYN including an error of logic 1 in the third bit is shown.

As shown in FIG. 5, the FRM SYN detecting circuit is composed of first-signal generating circuit 1 for providing a first signal S5 and error detecting circuit 4. First-signal generating circuit 1 is made up of 8 bit shift register circuit 2 and AND gate 3. Shift register circuit 2 receives enable signal S1, shifts it by 8 bits in synchronization with clock pulse signal S2, thereby delaying enable signal S1 by 8 clock-pulse periods. AND gate 3 produces a logical product of enable signal S1 and inverted delayed enable signal S4 and delivers the logical product as first signal S5. Thus, first signal S5 takes a value of logic 1 exclusively while the FRM SYN is received (cf. signal S5 in FIG. 7). Referring to FIG. 6, error detecting circuit 4 is intended to extract any error present in the FRM SYN. Error detecting circuit 4 is provided with AND gate 5 and register circuit 6. AND gate 5 receives both first signal S5 and data signal S3 and delivers the logical product as second signal S6, thereby extracting the error bit in the FRM SYN (cf. signal S6 in FIG. 7). Register circuit 6 is provided with AND gates 7, 8 and D flip-flop 9. AND gate 7 receives both clock pulse signal S2 and first signal S5 and delivers clock pulse train S7 which is active only while the FRM SYN is received (cf. signal S7 in FIG. 7). AND gate 8 receives both second signal S6 and clock pulse train S7 and delivers clock pulse S8 which is synchronous with two signals S6, and S7. D flip-flop, enabled by enable signal S1, receives second signal S6 at its data input and clock pulse S8 at its clock input, latches second signal S6 at the trailing edge of pulse S8 and provides alarm signal S9. In this way the FRM SYN detecting circuit can detect any error present in the FRM SYN in real time.

Referring now to FIGS. 8 through 12 another embodiment of the present invention will be given. This embodiment provides a circuit for detecting the octet synchronization signal or a OCT SYN detecting circuit. The frame format employed is the same as that represented in FIG. 2. In this embodiment the frame is made up of 10 octets.

Figure 8:
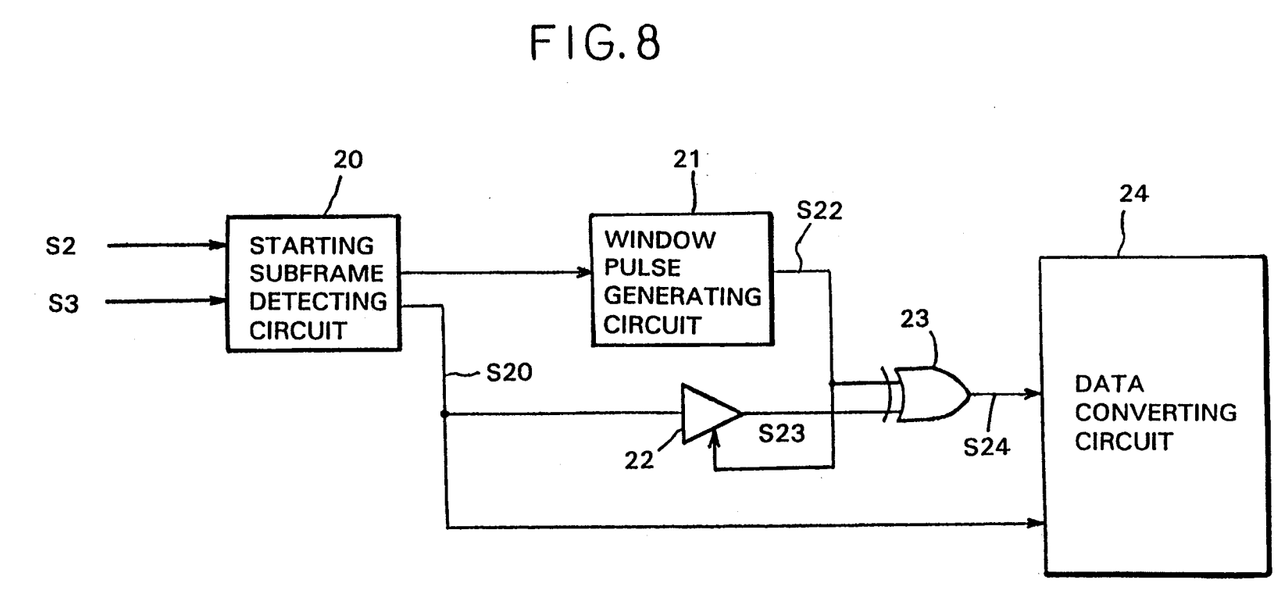
FIG. 8 represents a block diagram of a second embodiment of the present invention.
Figure 9:
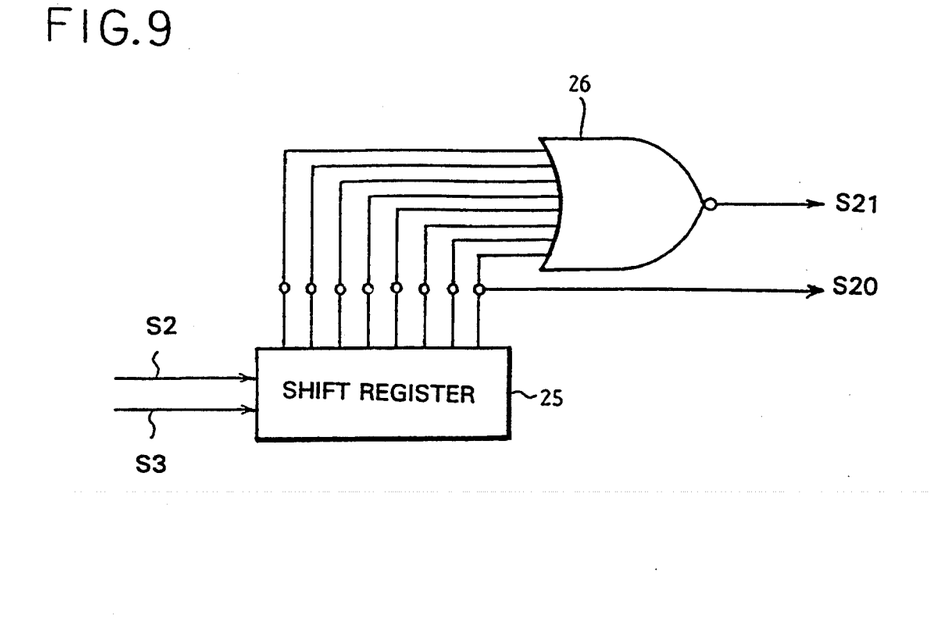
FIG. 9 represents a block diagram of starting subframe detecting circuit 20 shown in FIG. 8.

The OCT SYN detecting circuit comprises, as seen in FIG. 8, starting subframe detecting circuit 20, window generating circuit 21, transmission gate 22, exclusive-or gate 23 and data converting circuit 24. Starting subframe detecting circuit 20 is provided with 8-bit shift register 25 and 8-input NOR gate 26 and the parallel outputs of shift register 25 are connected with the inputs of NOR gate 26, as shown in FIG. 9. Shift register 25 shifts data signal S3 in synchronization with clock pulse signal S2. The serial output terminal of shift register 25 provides data signal S3 with a delay of 8 clock-pulse periods, which will be referred to as delayed data signal S20 (cf. signal S20 in FIG. 12). NOR gate 26 delivers single-pulse signal S21 in synchronization with the OCT SYN of the second octet (the first bit of the second octet) only when it receives logic 0 at all of its eight inputs, i.e., only when starting subframe detecting circuit 20 does not detect any error in the FRM SYN.

Figure 10:
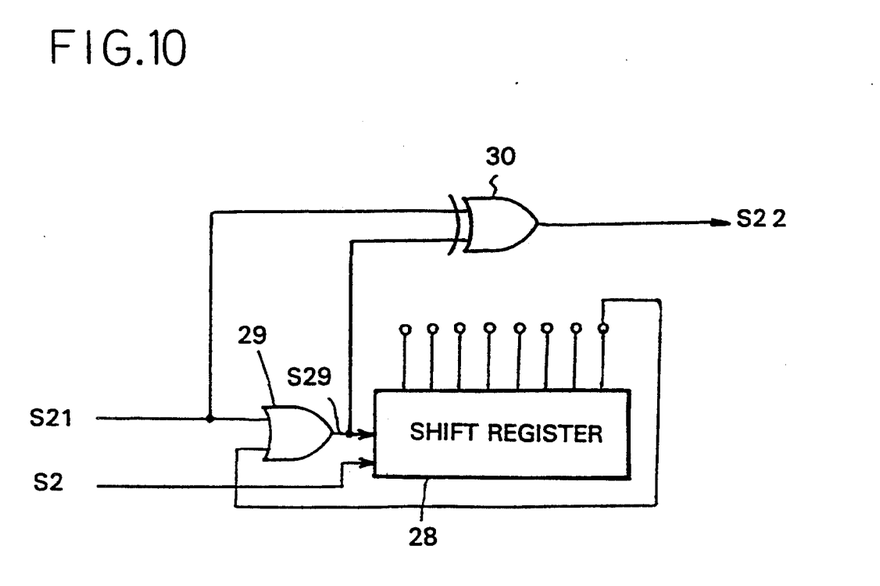
FIG. 10 represents a block diagram of window pulse generating circuit 21 shown in FIG. 8.
Figure 12:
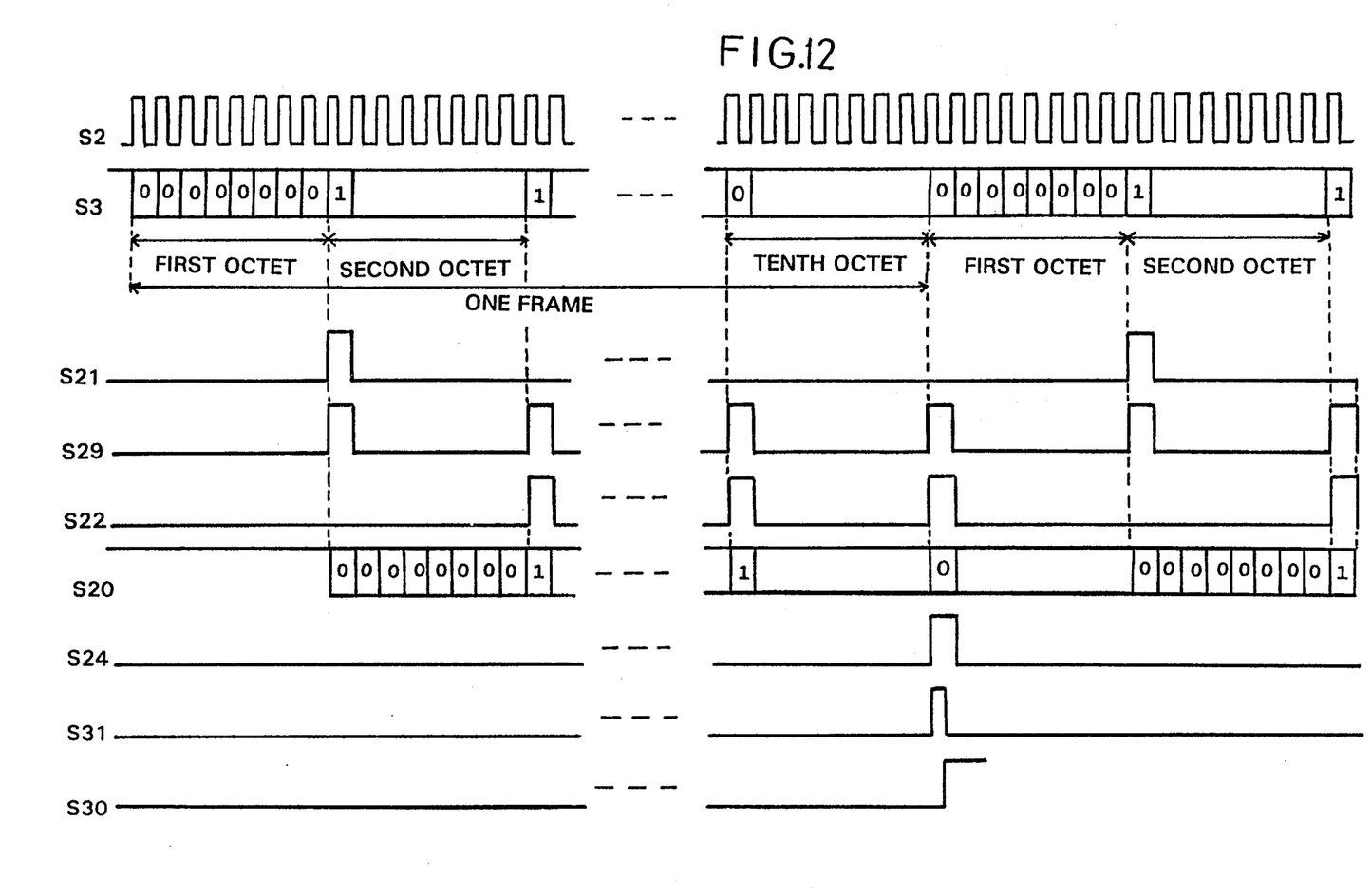
FIG. 12 represents a timing chart to illustrate the operations of parts of the circuits shown in FIGS. 8 through 11.

Window pulse generating circuit 21 generates window pulses. The window pulses make a pulse train with component pulses generated synchronously with the OCT SYNs (the first bits) of the third and subsequent octets, as shown in FIG. 12 as signal S22. Window generating circuit 21 is provided with 8-bit shift register 28, OR gate 29 and exclusive-OR gate 30. OR gate 29 generates a logical sum of single-pulse signal S21 and the serial output of shift register 28 and delivers it to the serial input of shift register 28 as signal S29. Shift register 28 delays serial-input signal S29 by 8 clock-pulse periods and the delayed output or the serial output is again supplied to the serial input via OR gate 29. Accordingly, shift register 28 and OR gate 29 cooperate to provide recursive means which generates a pulse train having a single-pulse signal as the leading pulse with a repetition period of 8 clock-pulse periods. Exclusive-OR gate 30 excludes single-pulse signal S21 from signal S29, thus providing window pulses S22 shown in FIG. 12.

Figure 11:
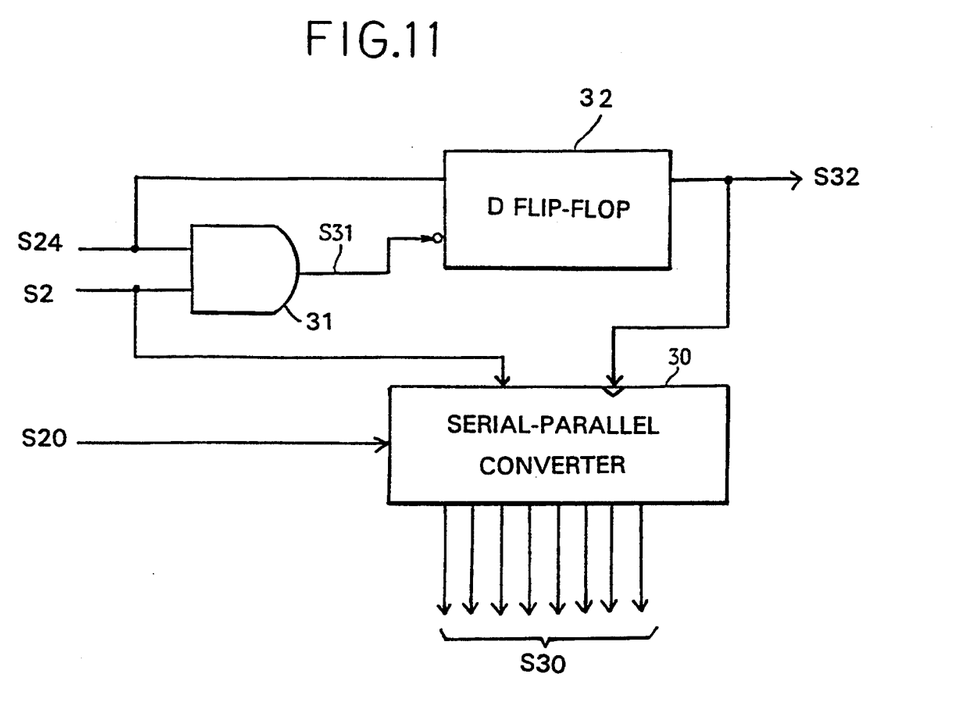
FIG. 11 represents data converting circuit 24 shown in FIG. 8.

Transmission gate 22 shown in FIG. 8 transmits delayed data signal S20 under control of window pulse signal, thereby extracting the first bit of the second and subsequent octets assigned to the OCT SYN (delayed by 8 clock-pulse periods). The output of transmission gate 22 will be referred to as signal S23. Error detecting gate 23 is an exclusive-OR gate. It receives window pulses S22 and signal S23 and excludes correct bits assigned to the OCT SYN from being output, thereby delivering any possible error bit S24, as shown in FIG. 12. Data converting circuit 24 is provided with serial-parallel converter 30, D flip-flop 32 and AND gate 31. Serial-parallel converter 30 converts serially supplied delayed data S20 to parallel data S30 in synchronization with clock pulse signal S2. AND gate 31 receives error bit S24 and clock pulse signal S2, and provides clock pulse S31 synchronous with the two inputs. D flip-flop 32 latches error bit S24 synchronously with clock pulse S31 and delivers reset signal S32. Reset signal S32 causes serial-parallel converter 30 to be disabled and also causes to generate an alarm signal.

Now, the operation of the present embodiment will be given below in the case in which the FRM SYN is designated by assigning logic 0 to all bits of the starting octets (the first octet) and the OCT SYNs are designated by assigning logic 1 to the first bit in each of the second through tenth octets. Further, it is assumed in the present embodiment that the OCT SYN of the tenth octet is in error (logic 0), as shown in data signal S3 in FIG. 12.

Receiving data signal S3 and clock pulse signal S2, starting subframe detecting circuit 20 delivers single-pulse signal S21 in synchronization with the first bit of the second octets, which indicates the FRM SYN does not include any error. Receiving single-pulse signal S21, window pulse generating circuit 21, starting from single-pulse signal, repeatedly generates pulses (signal S29) synchronously with the first bit in each octet. Exclusive-OR gate 30 in window pulse generating circuit 21 shuts out single-pulse signal S21 from signal S29 to provide window pulses S22. Window pulses S22 control transmission of delayed data signal 20 through transmission gate 22 to extract the first bits of the second through ninth octets delayed by one octet period (8 clock-pulse periods). The exclusive-OR gate of error detecting gate 23 excludes correct bits of the first bits delivered from transmission gate 22 from being transmitted and supplies only an error bit to data converting circuit 24. Data converting circuit 24 converts normally serial-input delayed data signal S20 to parallel data signal S30. When error bit S24 is detected, data converting circuit 24 stops the serial-parallel conversion and delivers an alarm signal.

In most cases the OCT SYN is assigned to the first bit of each octet. However, the OCT SYN can be assigned to the kth bit (k is larger than 1 and equal to or less than 8). In this case, it is necessary to delay the output of NOR gate 26 in starting subframe detecting circuit 20 by k-1 clock-pulse periods by means of, for example an additional k-1 bit shift register and to use the delayed output of the k-1 bit shift register as single-pulse signal S21. In this way the object of the present invention can be attained without any further modification.

It is to be understood, however, that although the characteristics and advantages of the present invention have been set forth in the foregoing description, the disclosure is only illustrative, and changes may be made in the arrangement of the parts within the scope of the appended claims.

What is claimed is:

1. A circuit for detecting a frame synchronizing signal in frame synchronization data transmission, all bits of said frame synchronizing signal being designated with codes of an identical logic level, the circuit comprising first means for providing a first signal which takes the logic 1 exclusively during the period that said frame synchronizing signal is received, said first means including delaying means, inverting means and first gate means, said delaying means delaying an enable signal received through said frame synchronization data transmission by a transmission period of the frame synchronizing signal and delivering a delayed enable signal, said inverting means inverting the delayed enable signal and said first gate means providing the logical product of said enable signal and the inverted signal of said delayed enable signal and delivering the logical product as said first signal, and second means for extracting any error bit present in said frame synchronizing signal, said second means being provided with second gate means which receives both said first signal and the data signal transmitted through said frame synchronization data transmission and produces a second signal corresponding to the logic product of the two signals, the second signal being the error bit.

2. A circuit as claimed in claim 1, wherein said delaying means includes shift register means with the same number of bits as that of said frame synchronizing signal, said shift register means receiving a clock pulse signal and said enable signal transmitted through said frame synchronization data transmission, shifting said enable signal in synchronization with said clock pulse signal and delivering the serial output as said delayed enable signal.

3. A circuit as claimed in claim 1, wherein said second means includes register means for registering said second signal.

4. An error detecting circuit as claimed in claim 3, wherein said register means is provided with third gate means and D flip-flop means, said third Gate means receiving both said second signal and said clock pulse signal transmitted through said frame synchronization data transmission to select from said clock pulse signal a clock pulse which is synchronous with said second signal, and said D flip-flop means latching said second signal in synchronization with the output of said third gate means.

5. A circuit for detecting a subframe synchronizing signal in the frame synchronization data transmission system, in which the frame is made up of a plurality of subframes, each subframe having M bits, M being an integer grater than 0, each bit transmitted in synchronization with a clock pulse signal for the data transmission, a frame synchronizing signal is assigned to all bits of the starting subframe and a subframe synchronizing signal is assigned to the kth bit of each subframe except for said starting subframe, said kth bit being designated with a first logic level, k being an integer greater than 0 and equal to or less than M, the circuit comprising starting subframe detecting means both for detecting said starting subframe and for delaying supplied data signal by M clock-pulse periods, said starting subframe detecting means generating a single-pulse signal of said first logical level in synchronization with said kth bit of the second subframe that follows said starting subframe when said starting subframe detecting means does not detect any error in said frame synchronizing signal assigned to said starting subframe, window pulse generating means for generating window pulses, the window pulses being a pulse train with a component pulse generated synchronously with said subframe synchronizing signal of each subframe except for said second subframe, the leading pulse of said pulse train being generated by delaying said single-pulse signal by M clock-pulse periods, the subsequent pulses thereof recursively generated by delaying the preceding pulse by M clock-pulse periods, and a pulse of the recursively generated pulses that is synchronous with said single-pulse signal being excluded from being output, transmission gate means which selects said kth bit of said subframe except for said starting subframe from said data signal delayed by said starting subframe detecting means under control of said window pulses, and error detecting gate means which selects from the output of said transmission gate means any error bit of said subframe synchronizing signals.

6. A circuit as claimed in claim 5, wherein said starting subframe signal detecting means includes first shift register means with a serial input and M-bit parallel and serial outputs and first logical sum gate means with M inputs connected with said M-bit parallel output of said first shift register means, said first shift register means shifting serial-input data signal in synchronization with said clock pulse signal and delivering a serial output as the delayed data signal, and said first logical sum means providing an output pulse of the first logic level only when said starting subframe does not include any error bit, the output pulse of said first logical sum means being the single-pulse signal.

7. A circuit as claimed in claim 5, wherein the starting subframe detecting means includes first shift register means with a serial input and M-bit parallel and serial outputs, first logical sum gate means with M inputs connected with said M-bit parallel output said first shift register means and first delaying means, said first shift register means shifting serial-input data signal in synchronization with said clock pulse signal and delivering a serial output as the delayed data signal, said first logical sum gate means providing an output of the first logic level only when said starting subframe does not include any error bit, and said first delaying means delaying said output of said first logical sum gate means by k-1 clock-pulse periods, the output of said first delaying means being said single-pulse signal.

8. A circuit as claimed in claim 6, wherein said window pulse generating means includes recursive means and exclusive-Or gate means, said recursive means comprising delaying means and second logical sum gate means, said delaying means delaying the output of said second logical sum gate means, and said second logical sum gate means providing the logical sum of the single-pulse signal and the output of said delaying means, and said exclusive-Or gate means receiving said single-pulse signal and the output of said second logical sum gate means and excluding said single-pulse signal from being output, thereby delivering the window pulses.

9. A circuit as claimed in claim 7, wherein the window pulse generating means includes recursive means and exclusive-Or gate means, said recursive means comprising second delaying means and second logical sum gate means, said second delaying means delaying the output of said second logical sum gate means, and said second logical sum gate means providing logical sum of the single-pulse signal and the output of said second delaying means, and said exclusive-Or gate means receiving said single-pulse signal and the output of said second logical sum gate means and excluding said single-pulse signal from being output, thereby delivering the window pulses.

10. A circuit as claimed in claim 8, wherein the circuit further includes register means for registering the error bit, the register means including logical product gate means and D flip-flop means, said logical product gate means transmitting the clock pulse signal only when said error bit is detected by said error detecting gate means, and said D flip-flop means latching said error bit in synchronization with the output of said logical product gate means.

11. A circuit as claimed in claim 9, wherein the circuit further includes register means for registering the error bit, said register means including logical product gate means and D flip-flop means, said logical product gate means transmitting the clock pulse signal only when said error bit is detected by said error detecting gate means, and said D flip-flop means latching said error bit in synchronization with the output of said logical product gate means.

* * * * *